//

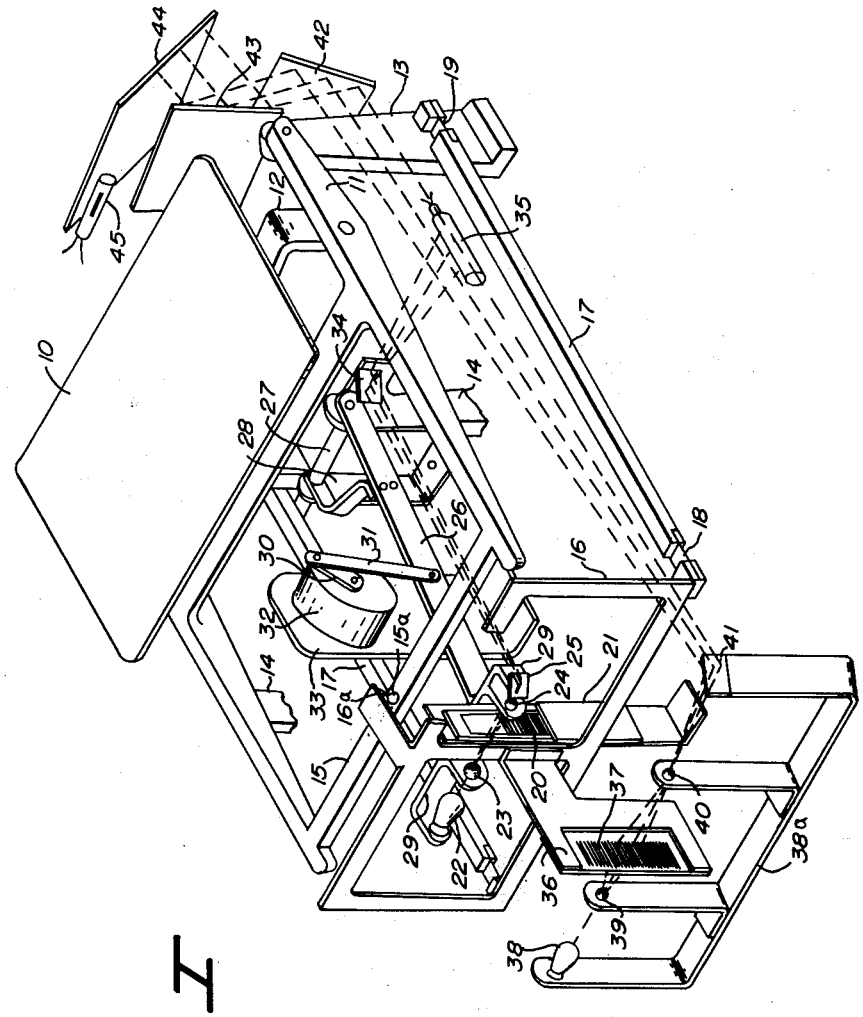

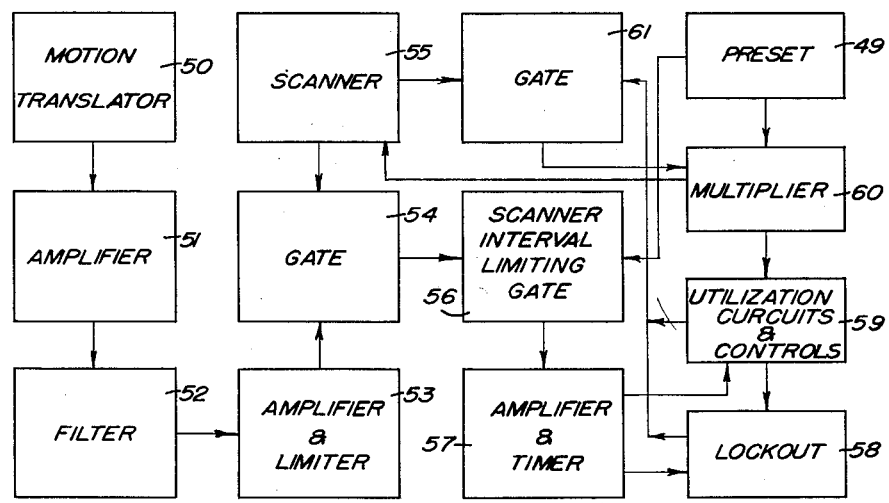
*Fig. II*
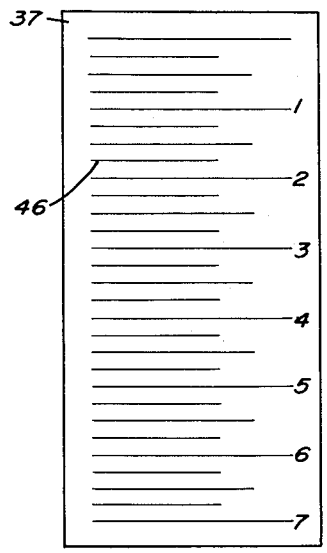
*Fig. IV*
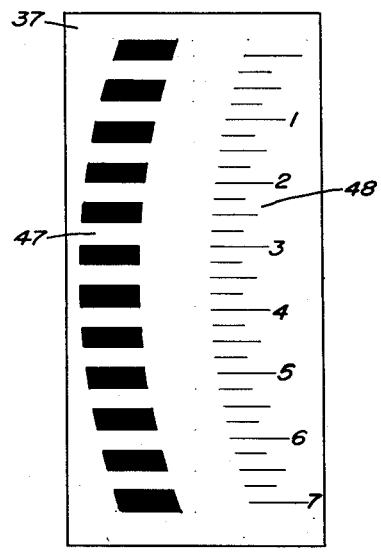
*Fig. V*

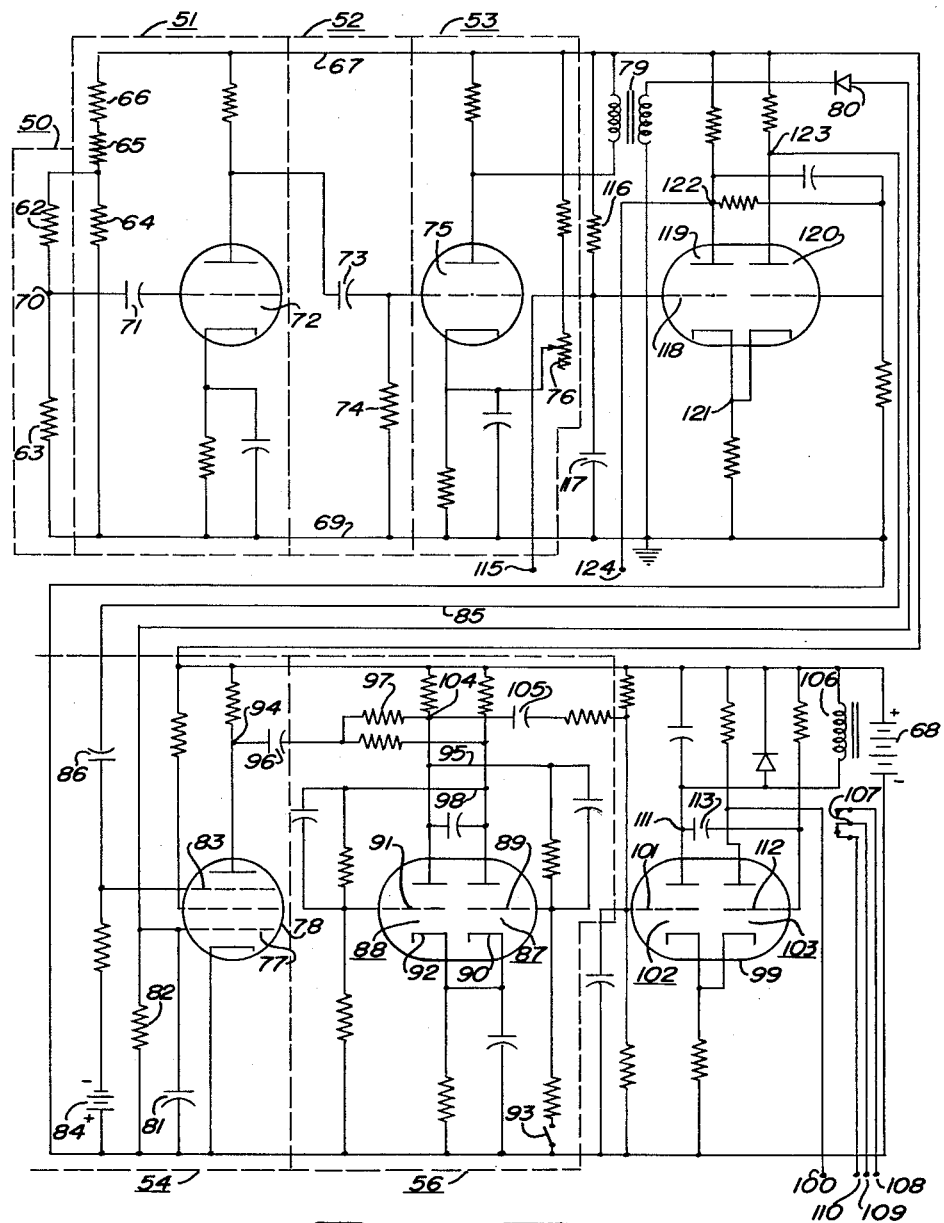
Fig. III
INVENTORS.
ROBERT E. BELL
ROGER B. WILLIAMS JR.

United States Patent Office 3,042,128
Patented July 3, 1962

3,042,128
CONDITION RESPONSIVE DEVICE WITH MOTION
DETECTING MEANS
Robert E. Bell and Roger B. Williams, Jr., Toledo, Ohio, assignors, by mesne assignments, to Toledo Scale Corporation, Toledo, Ohio, a corporation of Ohio
Filed May 8, 1957, Ser. No. 657,826
7 Claims. (Cl. 177—210)

This invention relates to condition responsive devices and particularly to controls for such devices.

It is desirable in condition responsive devices as typified by weighing scales to effect certain operations only after a particular set of conditions have been met. Such conditions may be essential to the accurate employment of the device as in the case of a requirement that the relative motion between certain movable elements and the stationary elements decline below a predetermined level. Where the condition responsive device employs a repetitively operated readout mechanism, it is desirable that the readout be initiated at some fixed point such as at the beginning of a readout interval rather than at some random intermediate point in the interval. Additionally, where the information derived is employed in some further manner, as in a remote display of the load value, as the input to a printing mechanism, or as a portion of the data fed to a computer, hereafter generically termed a utilization means or mechanism, it may be desirable to bar the effective readout until the mechanism has been preconditioned, for example, as by presetting the multiplying factor in a multiplier.

In the high speed measuring art it is advantageous to reduce the interval required to make a measurement to a minimum. Many measuring techniques involve utilization of a movable indicator system having sufficient mass that the inertia of the system causes overshoot and oscillations as the system centers on the value to be indicated. The resulting oscillations around this indicated value necessitate a delay in taking a reading or utilizing the indication until the oscillations have ceased or have been reduced an amount sufficient to render information derivable therefrom of the degree of accuracy required. Heretofore, several techniques have been employed with measurement equipment providing signals which are utilized in apparatus coupled thereto to prevent the transmittal of signals to the utilization equipment until the mechanical oscillations of the system have ceased. Manually actuated controls relying upon the discretion of an operator to feed the signals to the utilization means at the appropriate moment are one of the most elementary approaches to this problem. Motion in the mechanical system of a measuring device has been detected automatically by employing sensing means, such as spring loaded contacts on a portion of a mechanical damping mechanism, such as a dashpot, whereby any forces due to the movement of the system opposed by the dashpot or damping mechanism are sufficient to operate the contacts and render an indication that the system has not yet come to rest. Another form of motion detector utilizes a friction clutch between the movable system of a measuring device and a contact member to sense displacement of the system from its ultimate stationary position. An example of this form of sensing mechanism includes a horizontal rotating shaft, as might be used to support an indicator, on which is mounted a pendulum embracing the shaft with a sliding fit to form a slipping connection therewith. The pendulum is positioned between a pair of spaced contacts whereby any continued rotation of the shaft causes the pendulum to contact one of the spaced contacts and render an indication of movement. When the system has come to rest, the slipping connection between the pendulum and the shaft permits the pendulum to fall away from and center between the contacts. Thus, a circuit including these contacts can be arranged to actuate mechanism responsive to the ultimate stationary or essentially stationary movable system.

These prior systems, in many instances did not adapt themselves to practical utilization in precision measuring devices inasmuch as they require a sliding or a resilient connection to the movable system both of which introduced inaccuracies in the measurements derived from the system by virtue of the mechanical loading they imposed thereon.

In accordance with the above, one object of this invention is to improve the apparatus for and techniques of controlling condition responsive devices.

Another object is to improve the apparatus for and techniques of detecting motion in a measuring apparatus including movable elements.

Another object is to detect motion in a movable system without requiring a mechanical coupling between the detector and the system, thereby avoiding the creation of any friction in or the exertion of any reaction force on the system.

An additional object is to facilitate the incorporation of motion detecting means in a mechanical system subject to movement without substantial alteration of the structure of the mechanical system.

Further objects of the invention are to speed up the readout of information from a mechanical system, to prevent false indications from the system by premature readout of that information; to prevent false readout as in systems involving a scanning operation by insuring that the information derived from a scan, after termination of movement in the system, is that resulting from an entire scan and not only a fractional portion thereof; and to assure that utilization means coupled to a condition responsive device have attained their required preset conditions before initiating operation.

At the outset, a general understanding of the invention will be facilitated by an outlined description of its utilization in a weighing scale. One specific form of such a scale generating an electrical signal indicating the applied load by means optically scanning an indicia bearing element and photoelectrically sensing the results of that scan is disclosed in the application of Clarence E. Adler entitled, "Indicator Scanning Device," Serial No. 553,457, now Patent No. 2,938,126, which was filed December 16, 1955. The present invention as employed in this scale photoelectrically senses motion through an optical system employed to project a visual weight indication on a display surface. A translucent chart having opaque indicia is mounted on the moving system so as to be moved across a beam of light which is projected on a display screen. The image formed by the interposed chart is focused on the screen by the optical system. Motion is sensed by photoelectrically monitoring the projected image or a portion thereof. An image of alternate lighter and darker areas, when moved across the photocell by any motion in the system, produces a pulsating electrical signal. The photocell is coupled to a signal amplifier and a detection circuit which enables effective use of the weight indicated when the frequency of the electrical pulsations falls below a predetermined level.

Upon the reduction of relative motion to the acceptable level, an indicator can be operated or additional circuits rendered effective. As discussed in some detail below, an automatic readout can be made effective and that readout can be fed to a properly conditioned utilization means, advantageously, by utilizing electrical control circuits. These control circuits monitor the signal from the photoelectric scan and pass a pulse at the end of each scan when motion has subsided whereby the first two end-of-scan pulses passed define complete scan of the essentially stationary scale. Where the scan is fed to a computer which must be preconditioned by setting up appropriate computing factors therein, additional circuits are provided to bar certain operations in the combination until those conditions have been set up. In the example, electronic coincidence gates have been employed to accomplish these control functions.

The features of this invention enabling the realization of the above objects include an optical system which translates motion into light pulses, and an electrical system in combination therewith which translates said light pulses into electrical signals for further utilization.

Another feature of the invention involves an optical system including a light source, collimating and focusing means for the source, and one or more elements upon which the light is projected all of which are maintained stationary thereby enabling them to be readily focused and maintained in that focused condition.

Another feature of the invention resides in incorporating only a translucent indicia bearing member or shutter in the movable system of a condition responsive device thereby reducing to a minimum the complexities and added mass involved in incorporating this motion detector in such a mechanism.

Another feature of the invention resides in a frequency sensitive detector incorporated in a condition responsive system to determine the instant motion in that system as translated to an electrical signal is reduced below a predetermined level.

Another feature of this invention includes means for adjusting the level of motion to which the system is sensitive or the level of spurious signals to which the system might otherwise respond.

A still further feature involves means requiring coincidence of a plurality of conditions in a condition responsive mechanism in order to initiate the utilization of the response from the mechanism.

The above and additional objects and features of this invention will be more readily appreciated from the following detailed description when read in conjunction with the accompanying drawings wherein:

FIG. I is a perspective view of a weighing scale embodying the present invention wherein portions of the structure are broken away to better illustrate the mechanical details incident to the invention;

FIG. II is a block diagram showing the cooperative relationships between the circuits of this invention;

FIG. III is a schematic circuit diagram of the motion sensing circuits of this invention; and FIGS. IV and V illustrate two forms of unitary motion indicating and weight indication charts suitable for incorporation in a scale of the type shown in FIG. I.

Referring now to the drawings, FIG. I shows a weighing scale of the type set forth in the aforementioned patent application of Clarence E. Adler. A load receiver 10 is pivotally supported on a main lever 11 by means of a spider 12. Main lever 11 is fulcrumed on a fulcrum stand 13 mounted on a base (not shown). Downwardly projecting arms 14 of the main lever 11 are attached to load counterbalancing elements (not shown) which advantageously may be counterbalancing springs in a compact counter top scale of the type under consideration here. Other structure not shown in the drawings but required in an actual scale includes check link mechanism, arranged to hold the load receiver 10 in upright position, means to seal the scale in at appropriate points in its displacement such as no load, full load, and half load, and some means for suppressing continued oscillation of the lever system following abrupt changes in the loading of the scale as, for example, a dashpot. In a scale of the type disclosed here, wherein the load counterbalancing forces are provided by springs, the sealing mechanism may assume the form disclosed in the sensitivity adjustment of M. A. Weckerly Patent 2,584,950, issued February 5, 1952 and entitled, "Sensitivity Adjustment for Weighing Scales."

The cross bar 15 at the free end of the main lever 11 supports an indicator drive frame 16. This frame can be supported by a cone pivot 15A secured to cross bar 15 and fitting into a socket 16A on the frame. Check links 17 connected by means of flexure plates 18 and 19 to the indicator drive frame 16 and the fulcrum standard 13, respectively, serve to maintain the plane of the frame parallel to a given plane through all degrees of displacement of the movable system.

The load counterbalancing means attached to the movable system comprising main lever 11, indicator drive frame 16, and check links 17 is arranged so that the indicator frame moves downwardly through equal increments of distance for equal increments of load applied to the load receiver 10. Thus, the displacement of the drive frame is a function of the applied load and is utilized in combination with suitable monitoring or readout equipment to sense and to indicate the magnitude of that load. The scale illustrated utilizes an optical and electro-optical monitoring means although it is to be understood that mechanical indicating equipment may be utilized as readily.

The electro-optical indicator illustrated is set forth in detail in the above-mentioned patent application of Clarence E. Adler. It comprises a stationary chart 20 generally of a relatively low degree of translucence bearing a series of closely spaced indicia of a higher degree of translucence, a shutter 21 supported from the indicator drive frame 16 so as to move through a planar path parallel to the chart 20, and a photoelectric scanning combination arranged to reciprocate along a path parallel to the chart and shutter whereby a determination is made of the amount of the chart which is not masked by the shutter or conversely the portion of the chart which the shutter has masked from the scanner.

The optical scanner comprises a light source 22, a condensing lens 23, a projecting lens 24, and a reflector 25 arranged to project a beam of light generally normal to the chart 20 and all supported on a reciprocating scanning device including a lever 26. The lever 26 is pivotally mounted on an axle 27 mounted in a support bracket 28 which is secured to the base of the scale. The light source, condensing lens, projecting lens and reflector are all mounted at the other end of the lever on a multi-arm bracket 29 carried thereby so that the light source and condensing lens are positioned on one side of the chart and shutter combination while the projecting lens and reflector are positioned in alignment therewith on the opposite side of the chart and shutter. The lever 26 is oscillated or driven by a crank 30 and connecting rod 31, the crank 30 being mounted on the output shaft of a motor 32. The motor 32 is preferably mounted on a motor stand 33 secured to the base of the scale.

In operation, the free end of the lever 26 and the elements of the optical system supported thereby indicate the absolute degree of displacement of the moving system by scanning the portion of the chart which is exposed by the shutter 21. This is accomplished by moving the aligned optical elements through a distance that is approximately 30 percent greater than the full scale travel of the indicating frame 16. Thus, the light beam from the source 22 to the projection lens 24 passes through the translucent indicia on the chart 20 which are exposed by the shutter 21 to reflector 25, thence to reflector 34 mounted on the axis of the lever axle 27 and to a photoelectric cell 35 also positioned on that axis. Each translucent indicia momentarily irradiates photocell 35 with a higher than normal level of light, thereby changing the characteristics of the cell. Thus, with no load on the load receiver 10 the shutter 21 just masks all of the indicia on the chart 20 and as a result no light is projected upon the photocell 35 by the optical system. As the load on the scale is increased the indicator frame 16 is displaced downwardly thus carrying the shutter 21 downwardly to expose the translucent lines on the chart 20. Light passing through the exposed lines is cast by the projecting lens 24 on the photoelectric cell 35 to generate in that cell a pulsating signal having a number of pulses corresponding to the number of exposed lines. These pulses are fed from the photoelectric cell which constitutes the sensing or signal translating portion of a reading device through an amplifier and shaper all of which are represented in block diagram form as a scanner 55 in FIG. II. From the scanner they are fed to a pulse generator which generates a train of pulses for each scan pulse, a matrix which passes only certain pulses of each train and thereby functions as a multiplier 60 of the scanned pulses, a counter, and a utilization circuit 59. A typical computer and pulse utilization circuit which can be combined with the present invention is shown in the application of Robert E. Bell and Roger B. Williams, Jr., entitled, "Industrial Computing Scale," Serial No. 592,932 which was filed June 21, 1956. The combination of the present invention with a computing scale is also shown in an application filed herewith entitled "Load Measuring Apparatus," Serial No. 657,947, for Robert E. Bell and Roger B. Williams, Jr.

Rapid weighing with a scale employing the above scanner structure to readout the value of the applied load is realized advantageously by continuously operating the scanner thereby avoiding the delays which might otherwise be incurred in bringing the intermittently stopped scanner up to speed. When the scanner output is fed to a computing or other utilization circuit, some means is provided to actuate the readout of a load value at an approximate moment and to maintain the circuit ineffective at other instants both before and at the completion of the readout cycle. One such means employed with the scale of the above Adler application involved providing a readout switch which could be actuated by an operator when he judged the appropriate moment had arrived. This reliance upon the discretion of the operator led to delays in the scale utilization where the operator was inattentive or had slow reaction times, or to incorrect operations when the switch was closed before the scale had reached equilibrium. The present invention overcomes these disadvantages by automatically initiating operation of the readout means at the first instant the scale is conditioned to deliver an accurate load indication.

The mechanism which senses one of the conditions which must be coincident to achieve accurate readout, namely the cessation of motion or its reduction below a given level, involves a mechanical system which cooperates with an electro-optical system. The motion sensing elements are illustrated in FIG. I wherein the scale indicator drive frame 16 is provided with a bracket 36 which supports a translucent indicating chart 37 in a plane normal to the axis around which the main lever 11 pivots. An optical system fixed to the base of the scale or otherwise stationarily mounted with respect to the fulcrum stand 13, for example by standard 38A, is arranged so that light from a source 38 such as an incandescent lamp, is collimated and projected by means of a condensing lens 39, projecting lens 40, and a combination of reflectors 41, 42 and 43. The fixed optical elements 38 through 43 are arranged to cast the image created at the plane in which chart 37 travels on a display screen 44 and photoelectric cell 45 at the front portion of the scale. For purposes of compactness and convenience the path of the light is folded from a path parallel to the pivot axis of main lever 11 to a path in a plane normal to that axis.

The projected image obtained from the movement of chart 37 across the path of light from source 38 serves two functions. It provides a visual indication of the load on the load receiver 10 by projecting an image of a portion of an indexed and labeled scale on weight chart 37 as shown in FIGS. IV and V on the display screen 44. An indicator pointer or line (not shown) is positioned in the optical system to appear on the display screen in alignment with the projection of the chart 37 indicating the load as by casting a shadow on the screen superimposed on the chart image or by being etched or otherwise formed directly on the display screen.

The second function of the projected image is to indicate the degree of motion in the system, and in particular for present purposes, to indicate the instant that motion falls below a predetermined level which is consistent with accuracy in the scale. Motion is detected by monitoring a restricted area of the light beam comprising that traversed by a projection of the more opaque lines 46 on the translucent chart 37. Photocell 45 is arranged to accomplish this monitoring function by being positioned so that the projection of the image of lines 46 fall thereon and by being appropriately masked to receive a suitable portion of that projected image. Advantageously the spacing of the alternate areas of high and low illumination in the image at the photoelectric cell are chosen so that an area of low illumination completely covers the exposed photosensitive area of the cell when centered on that area and an area of high illumination when centered thereon completely embraces that sensitive area. Thus, as the movable system of the load measurer is in motion and, as a result, chart 37 is moved across the optical path between source 38 and cell 45 the cell is alternately subjected to high and low levels of illumination which are translated to electrical pulses. Alternatively, when the system ceases to move the level of illumination on the photosensitive area is constant and the translated electrical signal therefrom is of steady value. Intermediate the stationary state and that wherein the image moves an amount sufficient to cause the cell to be illuminated to both the maximum and minimum levels, there may be signals arising from very slight movement of the system, less than a full index line width, which it is desirable to disregard. Electrical circuits for measuring the presence or absence of motion of a significant amount and for conditioning the load measurer for readout in response to the photocell signal will be discussed below.

In one embodiment of this motion detecting mechanism the photosensitive surfaces employed comprise two elongated areas each 0.020 inch wide and separated by 0.020 inch. The portion of the projected image permitted to fall upon these surfaces embraces two one and one half alternate dark and bright areas which are parallel in their long dimension with the long dimension of the exposed photosensitive surfaces. The projected areas correspond in their dimensions to the photosensitive areas in order to realize the maximum distinction between the signal levels in the darkened and irradiated state.

Two forms of charts suitable for projection in the illustrated embodiment are shown in FIGS. IV and V. That of FIG. IV comprises a rectangular array of characters and alternate regions of high and low levels of translucence. The portion of the chart on the right is utilized to project the visual indication of load on the display screen 44 while the continuations of the index lines 46 at the left are projected upon the photoelectric cell 45 to provide a means of sensing motion in the movable system and translate that motion to pulsating electrical signals. Thus, it is seen that the motion detection feature can be incorporated in a projection system with little or no modification of that system other than to provide a photoelectric cell for signal translation.

FIG. V shows a chart 37 which is operative over a wider range of deflection than that of FIG. IV and offers a motion indicating optical signal generator 47 separate from the visual indicating means 48. In this chart the spacing of the light and dark areas of the optical signal generator 47 of the motion detector can be chosen to best suit the dimensions of the photoelectric cell without dictating any changes in the visual indicator. The bounds of the indicia groups 47 and 48 are curved along an arc centered at the fulcrum of the main lever to maintain a fixed transverse position of the projected image on display screen 44 for all deflections of the scale. This arcuate layout enables the image of a darkened line at the lower end of the group 47 to be centered on the photosensitive area of the cell with the assurance that when suitably loaded the lines at the full load or upper end of the chart and any lines in between those limits will be centered similarly. In the same manner transverse shifting of the visual indication on the display screen is avoided.

Utilization of the condition responsive element upon the reduction of motion in its movable system to a desired level is initiated in the present combination by an electrical control circuit. A circuit of this type is shown in FIGS. II and III. This circuit includes refinements for the better integration of the motion detection control with the scanner readout mechanism described above and the ultimate utilization element, a multiplier which multiplies the scanned value by a selected factor. This utilization is realized advantageously by requiring the scan signal to be effective in the multiplier only when motion in the system has been reduced to a level consistent with accurate measurement, i.e. when the signal from a full scan is available to the system after such motion level has been reached, and when the multiplier has been preset with an appropriate multiplying factor while the other conditions are coincident.

In practice, a computing weighing scale utilizing this invention is operated by positioning a load on its load receiver 10 and presetting a suitable multiplying factor as by closing a circuit in the preset or computing factor selector 49 of FIG. II. When motion in the movable system supporting the load receiver is reduced to the level permitting accurate utilization of a scan, the remaining signal variations from the motion translator 50 which passes the amplifier 51 are barred by filter 52 if their frequencies are below a predetermined level or by the amplifying limiter 53 if their magnitudes are below a selected level. The cessation of signals from amplifier 53 to gate 54 partially enables that gate so that it is triggered to the signal passing condition when it receives a pulse from the scanner 55 which is characteristic in defining the end of a scan. One such pulse might be the negative going signal at the end of an integrated train of scan pulses or an isolated pulse between the preceding scan and the first of the train resulting from the scan to be read. Means for deriving such marker pulses are shown in the above noted applications of Bell and Williams. The first signal from gate 54 when coincident with a signal from the preset 49 triggers gate 56 from a first to a second stable state. The second signal from gate 54 resulting from a marker pulse in the next succeeding scan corresponding to the first marker pulse returns gate 56 to its initial condition thereby switching the amplifier and timer 57 to operate lockout 58 and utilization circuit control 59. Lockout 58, which is not shown in detail, prevents the transmission of further signals from the scanner 55 to the multiplier 60 by triggering gate 61 to the blocking condition while the product of the read scan and the preset multiplying factor is fed to the active utilization circuit controlled by 59. As the utilization circuit control 59 becomes effective, it actuates a second lockout including gate 61 in FIG. II to maintain the multiplier 60 inactive while its product is utilized. This latter lockout is released at the end of the utilization cycle of the mechanism controlled by 59. One typical utilization mechanism for a device as outlined above is an actuating mechanism for a printer or postal meter as disclosed in the application of Clarence E. Adler filed of even date and entitled, "Load Measuring Device." The multiplier and its connection to a scanner are disclosed in one form in the above-mentioned application Serial No. 592,932 of Bell and Williams. The preset mechanism and its incorporation in a computer is disclosed in the application of Bell and Williams filed herewith mentioned previously.

Referring now to FIG. III, the details of the motion detector and sections intermediate it and the computer circuit are shown. Variations in illumination due to motion in the movable system are translated to electrical pulsations by photoresistive elements 62 and 63 in cell 45 across which a voltage is developed by resistance 64 of the voltage divider made up of resistances 64, 65 and 66 serially connected between line 67, held at B+ by source 68, and grounded line 69. Since photoresistive elements are temperature sensitive, variations in the resistance or sensitivity of elements 62 and 63 with temperature are at least partially compensated by employing a resistor 65 having a negative temperature coefficient, generally known as a thermistor, whereby decreases in the resistance and sensitivity of elements 62 and 63 with increases in temperature are met with an increase in the voltage applied across them. Thus, the potential between the junction 70 and ground can be maintained essentially constant over a reasonable range of temperature variations when element 63 is irradiated with a constant level of light.

Variations in the intensity of illumination on elements 62 and 63 cause inverse variations in their resistance and, thus, pulsating values of potential at junction point 70. These pulsations are passed by capacitor 71 to the grid of tube 72 where they are amplified, inverted in phase, and transmitted to the high pass filter 52 made up of capacitor 73 and resistor 74. This RC combination reduces the level of signal components in the frequency range of 80 cycles per second or less which pass to the grid of tube 75 of the amplifier and limiter stage 53 by a factor of three while passing higher frequencies with little attenuation.

This low frequency cutoff filter section eliminates the effect of slight vibration in the movable system induced by disturbances external of the scale and by those arising from operation of the scanner mechanism within the scale. Eighty cycles per second was chosen in this instance since it was a resonance frequency of the springs employed in the scale although it is to be appreciated that the cutoff frequency of this filter is not critical and the filter might be eliminated in certain applications wherein condenser 71 is relied on to segregate motion signals from steady state signals. This frequency limitation imposed by filter 52 does not materially affect the motion detection since the chart 37 contains 1280 lines in two inches and with normal damping traverses that distance with a full load applied in about one second. Normal damping brings the scale of the illustration to rest in about one and three tenths the interval required for the initial traverse hence the movable system is in essence at rest for the accuracy required in most applications by the time the rate of signal generation has declined to 80 cycles per second.

The signal level reaching the grid of tube 75 which is amplified by that tube is determined by the adjustment of rheostat 76 which adjusts the cathode potential of the tube. This rheostat can be adjusted conveniently as by a screwdriver adjustment accessible from outside of the control circuit housing. Thus, low level noise is eliminated and this tube functions as a combined amplifier and limiter 53. Changes in the plate current of tube 75, a pulse of increasing magnitude for a decrease in the level of illumination on the photosensitive element 63 or the converse, are effective to maintain the control grid 77 of gate tube 78 at cut off. Coupling to tube 78 is accomplished by transformer 79, which, when subjected to changes in signal level at its primary, causes unidirectional pulses through the rectifier 80 connected to its secondary to develop a negative charge on the capacitance 81. Resistance 82 is of such magnitude as to prevent that charge leaking from the capacitance 81 between pulses. The stored charge thus maintains control grid 77 at cut off as long as pulses of frequency and magnitude to pass the filter and limiter are generated and therefore as long as the movable system is in motion.

Tube 78 of gate 54 remains cut off even when motion has ceased until the negative bias imposed on the suppressor grid 83 by source 84 is overcome by a positive signal. A positive potential is imposed on suppressor 83 through lead 85 and capacitance 86 when a positive going signal is applied thereto. Since it is desirable that the scale utilization circuits be ineffective until the computer is supplied with a signal resulting from an entire train of scan pulses formed after the cessation of motion in the moving system, marker signals are supplied to tube 78 to define each scan. When a marker signal is coincident with the termination of motion, tube 78 is triggered. If the marker pulse is always taken from the same point in successive scans, two successive pulses passed by tube 78 must have a complete scan undistorted by motion in the movable system between them. One suitable means of producing a signal of this nature is to arrange a circuit to issue a positive going signal on lead 85 at the termination of a train of pulses resulting from a scan whereby the gate tube 78 is triggered at the end of the first pulse train, whether partial or complete, which is formed after the scale has reached equilibrium and at the end of each effective train thereafter.

The electrical pulses formed in circuits (not shown) connected to photocell 35 as a result of each scan of chart 20 are suitably formed in a circuit represented as scanner 55 in FIG. II and transmitted to multiplier 60 through gate 61. Multiplier 60 generates a pulse for each scan pulse which is fed back to the circuits of scanner 55 to provide a means of checking the operation of the multiplier. These pulses are of the same number and time separation as the scanner pulses and for the present purposes the scanner pulses could be employed in their place, although, gate 61 when actuated by the lockout means disables the multiplier thereby preventing the generation of further end-of-scan pulses as derived from the multiplier operation and preventing any triggering of gate 54 during operation of the utilization means. They are applied as negative pulses to terminal 115 as shown in FIG. III and integrated in a circuit comprising resistance 116 and capacitance 117 having a time constant such that grid 118 is maintained negative throughout the train and is permitted to rise in potential a short time after the train is terminated and before the beginning of the next train. Thus, grid 118 is driven negatively at the beginning of each scan held negative throughout the scan and allowed to rise at the end of each scan.

Grid 118 controls a Schmitt trigger comprising triodes 119 and 120 and their associated circuitry. Triode 119 is the normally conducting section of the trigger. The negative going signal on grid 118 at the beginning of a scan cuts off triode 119 reducing the potential of the interconnected cathodes at point 121 and raising the potential of point 122 to a level initiating conduction in triode 120 and, thereby, decreases the potential at point 123 in the plate circuit of that triode. If desired, the increase in potential at the plate of triode 119 can be tapped off as at terminal 124 to provide a beginning-of-scan marker pulse the utilization of which will not be discussed in detail here. Shortly after the termination of the pulse train, the potential of grid 118 is permitted to rise whereby triode 119 again becomes conductive. This reduces the potential at point 122 and raises the potential of point 121 sufficiently to cut off triode 120. Point 123 is increased in potential incidental to this cut off to provide a positive going end-of-scan marker signal which is applied through lead 85 to suppressor grid 83 of gate 54.

The term of a complete scan interval while the scale is at equilibrium is sensed and indicated by the cycling of the double triode trigger circuit or flip-flop of gate 56, connected to the output of tube 78 at point 94. The flip-flop is switched from its normal state, a conductive state in triode 87, to its abnormal state, with triode 88 conductive, and back to its initial condition. This cycle is induced by successive end-of-scan signals applied at lead 85 while grid 77 is biased to permit tube 78 to conduct. Initially, the circuit 56 is conditioned for gating by connecting the control grid 89 of triode 87, the normally conducting stage, to ground through a normally open contact 93 so that grid 89 is more positive with respect to its cathode 90 than control grid 91 of tube 88 is with respect to its cathode 92. Triode 87 is thus in its conducting or low impedance state while triode 88 is in its cut off or high impedance state. Contact 93 is closed when a relay (not shown) is actuated by operation of any one of a plurality of selectors which, in practice, are portions of the preset mechanism shown as block 49 in FIG. II and are operated to establish the multiplying factor to be employed in the multiplier 60. This arrangement requiring operation of a preset before each weighing is desirable to insure proper computation when the articles weighed successively are likely to be subject to different multiplying factors, i.e. different rates per unit of weight.

Consider the operation with triode 87 conductive. A gated pulse from tube 78 will reduce the potential at point 94 thereby tending to reduce the potential on lead 95 through coupling condenser 96 and resistance 97 and reducing the potential of control grid 89. This reduces the plate current of triode 87 and raises the potential of grid 91 through lead 98 so that triode 88 begins to conduct whereby the potential of lead 95 is further depressed to continue the reduction of the current in triode 87. This regenerative effect cuts off triode 87 and maintains triode 88 conductive until receipt of the next pulse from tube 78. Point 94 is again depressed in potential by a second end-of-scan pulse on lead 85 to repeat the trigger cycle by causing the triodes 87 and 88 to revert to their initial condition.

The double triode 99 of the amplifier and timer section 57 in combination with its associated circuit elements constitutes a one shot multivibrator. The normally non-conducting section of the multivibrator is triggered by the positive going signal resulting from triode 88 returning to its nonconductive state, while it is triggered, subsequent scanner pulse trains are prevented from reaching the multiplier by means of a lockout signal at output terminal 100 and the utilization circuit controls are activated or rendered effective. The utilization means in this example can be considered to be the computer which when effective passes the computed signal to its output or the mechanism employing the computer output as a printer or a postal meter which when rendered effective produces a product which is a function of the computed value. Normally, triode 103 is conductive. Return of triode 88 to its high impedance condition develops a positive going signal at point 104 which is transmitted by coupling condenser 105 to control grid 101. Triode 102 then becomes conductive, its plate current passing through the actuating coil 106 for single-pole double-throw relay contact 107 to energize utilization circuits (not shown) connected between terminal 108 and terminal 109 of a power source (not shown) and to deenergize an interlock circuit (not shown) connected to terminal 110 which prevents repetitive operation of the utilization circuits. The plate current of the triode 102 also depresses the potential of point 111 to depress the potential of grid 112 of triode 103 below cut off. Coupling to grid 112 is effected through timing condenser 113 which is of a magnitude such that the charge thereon leaks off sufficiently to permit triode 103 to initiate conduction, 150 milliseconds after it has cut off. The initiation of conduction in triode 103 raises the cathode potential of triode 102 to return that triode to the cut off condition. In practice lockout of the read mechanism of the scanner is continued even after triode 103 reverts to its low impedance state by a supplemental lockout mechanism (not shown) which remains effective while the utilization circuits are functioning. This second lockout becomes effective about 50 milliseconds after the utilization circuit control is energized so that the two means overlap for an interval of about 100 milliseconds to insure against false operation of the system.

From the above it is seen that the first marker signal which is generated after the scale motion is reduced as required is effective to activate or condition the control means constituting gate 56 so that the next succeeding marker signal triggers that control means and by operation of the multivibrator renders the utilization means effective. While the end-of-scan signal has been employed as a marker, it is to be recognized that other markers might as readily be employed provided they were generated at similar positions in or portions of the pulse train. For example, the begin-scan signal at terminal 124 is one such marker.

In recapitulation of the invention, a means detecting relative motion between a stationary and a moveable system is disclosed. This means comprises an optical system 38 through 43 which is mounted on the stationary system, a chart 37 having adjacent regions of different degrees of translucence mounted on the moveable system in a position to intercept light projected from source 38 through the optical system, and a photoelectric cell arranged to receive light from the optical system through the chart. When relative motion exists electrical pulses are generated in the photoelectric cell by virtue of the variations in light intensity on the cell. A second means, the filter 52 and amplifier and limiter 53, is coupled to the detecting means, as by amplifier 51, and is responsive to a predetermined degree of relative motion by virtue of its filtering action, exemplified as an exclusion of signals below 80 cycles per second, and its limiting action, which excludes spurious low level signals. The response of this second means is in the form a cessation of the passage of signals, thereby indicating a cessation of significant relative motion between the stationary and moveable systems. The termination of signals from amplifier 53 is a prerequisite to the operation of the utilization means and can be considered a control means to operate the utilization means when the electrical pulses from the photocell elements 62 and 63 which exceed a predetermined signal level, set by the limiter, are reduced in frequency to a predetermined level.

In addition to the motion detector the invention embraces in combination therewith means sensing the degree of displacement of the moveable system with respect to the stationary system, in the form of scanner 55 shown generally in FIG. II and specifically in FIG. I as an oscillating optical system which scans a stationary chart 20 a portion of which is exposed by a shutter 21 mounted on the moveable system. The amount of chart exposed is a function of the degree of displacement of the system as is the number of light pulses generated in each scan so that the optical system is means generating a series of pulses of radiant energy proportional to the relative motion between the moveable and stationary systems. Photocell 35 is means translating said radiant energy pulses to electrical pulses.

The amount of displacement is a measure of the applied load when the system is employed in a weighing scale and the number of pulses from the scanner is employed in a utilization means. It is desirable to employ but one full scan taken immediately after the motion in the scale has essentially terminated. The pulses of that scan can be employed with a computing factor which is established as a prerequisite to utilization of the scan and thus constitutes conditioning means for the utilization means, as preset 49 represented as switch 93 of FIG. III which is closed when a multiplying factor is chosen in the example. The means defining the termination of a scan and thereby a marker signal for each scan through the generation of a positive going pulse on lead 85 when no further pulses are applied to terminal 115, can also be considered conditioning means for the utilization means since it enables gate 54 to enable scanner interval limiting gate 56 and amplifier and timer 57. Gate 54, is operative when an end of scan signal has been imposed thereon in coincidence with an absence of motion from the motion detector and scanner interval limiting gate 56 is effective when the preset 49 and gate 54 are operated so that each combination comprises means to render effective the utilization means when the second means has responded and the conditioning means has been operated.

Viewed in another sense gate 54 is a first control means operative upon the coincidence of response of a second means (the motion detector or means responsive to a predetermined degree of relative motion) with the definition of a scan termination (as indicated by a positive going signal on lead 85). Further, scanner interval limiting gate 56, actuated by a coincidence of the operation of gate 54 and preset 49, constitutes second control means operative upon the coincidence of operation of the first control means with the operation of the conditioning means.

When the second control means, scanner interval limiting gate 56 is operated, it operates amplifier and timer 57 to operate the utilization circuits 59 and lockout 58. This lockout in turn disables gate 61 so that no further signals are transmitted therethrough from the scanner 55 to the multiplier and thence to the utilization circuits until they are recycled. Thus the system includes means, 57, responsive to operation of the second control means, 56, to operate the lockout means 58 and the utilization means 59; and further, it includes lockout means for preventing the transmission of a signal from the scanning means 55 to the utilization means.

The single embodiment of this invention described above is intended to integrate the weighing functions of a parcel post scale with a suitable computer which automatically determines the postage appropriate for the weight indicated and the postal zone of the destination for the package as selected in the preset section 49. The computed value of postage as derived from the multiplier is further utilized to set and to actuate automatically a postage meter which prints stamps of the value required. However, it is to be understood that this application of the controls of this invention are intended merely as illustrative and are not to be interpreted in a limiting sense. Further, alternative forms of weighing scales or other condition responsive devices might be employed with the above controls without departing from the spirit or scope of the invention. The functions of the controls might be altered so that they merely enabled a computer to operate or controlled batching or other automatic mechanism, for example. The subcombination of the optical motion detector might be employed alone without diminishing its utility as by initiating operation of the mechanical scanner or switching on a remote indicator for a condition responsive instrument when motion reached a predetermined level. Alternatives to the scanner might be employed to sense the degree of displacement of the movable system. Specific details of the motion detector might be altered as by substituting a chart wherein the indicia have a first degree of translucence and the background another or where radiant energy other than visible light, such as infra red or ultra violet, is employed to project an indication of motion or the degree of displacement.

In view of the wide range of alternatives available to one skilled in the art it is to be understood that this invention is not to be restricted in scope or spirit to the specific embodiments mentioned and that these embodiments are to be read as illustrative only.

What is claimed is:

1. A condition responsive mechanism comprising a stationary system, a movable system, an optical system having elements mounted in said stationary system and elements mounted in said movable system, means transmitting an image through said optical system which by its variations indicates relative motion between said stationary and said movable systems, photoelectric means detecting said image, second means coupled to said detecting means and responsive to a predetermined degree of variation in said image, signal generating means issuing a signal which is a function of the degree of displacement of said movable system with respect to said stationary system, signal responsive means operating as a function of the displacement as ascertained by said signal generating means, a conditioning means for said signal responsive means, and means to render effective said signal responsive means when said second means has responded and said conditioning means has been operated.

2. A condition responsive mechanism comprising a stationary system, a movable system, an optical system having elements mounted in said stationary system and elements mounted in said movable system, means transmitting an image through said optical system which by its variations indicates relative motion between said stationary and said movable systems, photoelectric means detecting said image, second means coupled to said detecting means and responsive to a predetermined degree of variation in said image, means repetitively scanning the degree of displacement of said movable system with respect to said stationary system and generating a train of electrical pulses having a length which is a function of said displacement, means responsive to the initial portion of the pulse train for defining the initiation of a scan by said scanning means, a means responsive to said pulse train and operating as a function of displacement to provide a useful output from said mechanism, a conditioning means for said pulse responsive means, and means to render effective said pulse responsive means when said second means has responded to indicate a reduction in said image variations, a scan has been defined by said defining means and said conditioning means has been operated.

3. A condition responsive mechanism comprising a stationary system, a movable system, an optical system having elements mounted in said stationary system and elements mounted in said movable system, means transmitting an image through said optical system which by its variations indicates relative motion between said stationary and movable systems, photoelectric means detecting said image, second means coupled to said detecting means and responsive to a predetermined degree of variation in said image, means repetitively scanning the degree of displacement of said movable system with respect to said stationary system and generating a train of electrical pulses having a length which is a function of said displacement, means defining the termination of a pulse train, first control means operative upon coincidence of response of said second means with the definition of a pulse train termination, means responsive to said pulse train and operating as a function of the length of said train to provide a useful output from said mechanism, a conditioning means for said pulse responsive means to render it operative, and second control means operative upon the coincidence of operation of said first control means with the operation of said conditioning means for actuating said pulse responsive means.

4. In a condition responsive mechanism comprising a stationary system of elements and a movable system of elements, a lever in said movable system movable around an axis of rotation, a chart having a first degree of translucence supported from said lever and having its plane normal to said axis of rotation, a plurality of indicia on said chart having a second degree of translucence differing from that of said chart, a light source positioned on one side of said chart plane and mounted on said stationary system, a projecting lens, a display screen, a photosensitive electrical translating element, said lens, screen and element all effectively being positioned on the opposite side of said chart plane and mounted on said stationary system, said screen and element being positioned to receive a projected image of said indicia, and means indicating motion of said movable system with respect to said stationary system as a response to a predetermined electrical signal from said element characteristic of a predetermined rate of change of the illumination provided by the projected chart image.

5. In a condition responsive mechanism having a stationary system of elements, and a system of elements movable with respect to said stationary system, a restricted area light source, a photoelectric cell, a projection lens, an optical system mounted on said stationary system and including said projection lens directing light from said source to said cell, a member having a series of sections of alternately high and low levels of translucence coupled to the movable system and moving through the optical system transverse to the path of light therein between said source and said cell, a pulse detector connected to said cell, a position indicator and means rendering said indicator effective only upon the termination of pulse detection in said detector.

6. In a condition responsive mechanism having a stationary system of elements, and a system of elements movable with respect to said stationary system, a restricted area source of radiant energy, an electrical translator responsive to said energy as a function of the level incident thereon, a collimating means directing energy from said source to said translator, a member having a series of alternate transparent and opaque sections coupled to the movable system and moving in response to motion therein, said member being positioned to intercept the energy passing from said source to said translator whereby movement of said movable system causes the sections to alternately block and pass energy to said translator, a pulse detector connected to said translator, means limiting the minimum effective signal in said mechanism to that above the noise level of the signal, a position responsive means for said system, and means rendering said position responsive means effective upon the termination of signals exceeding said minimum level.

7. In a load measuring device including a stationary system of elements, a load receiver, a movable system of elements supporting said load receiver and moving a distance which is a function of the applied load, an optical projecting system, a member bearing sections of alternately high and low levels of translucence in said projecting system, said member and said projecting system being movable relative to each other as a function of the movement of said movable system, a display screen arranged to receive projections of said sections to display said sections and thereby constitute visual indicia of applied load, a photocell arranged to receive light from said projecting system, whereby movement of said movable system with respect to said stationary system causes the photocell to receive alternate high and low intensity light, a pulse detector connected to said photocell, a photoelectric means generating an electrical signal characteristic of the position of said movable system with respect to said stationary system and means rendering said photoelectric means effective upon the termination of pulse detection in said detector.

References Cited in the file of this patent

UNITED STATES PATENTS

| | | |
|---|---|---|
| 1,668,073 | Hebden | May 1, 1928 |
| 2,773,389 | King | Dec. 11, 1956 |
| 2,803,448 | Biebel | Aug. 20, 1957 |
| 2,856,176 | Cooper | Oct. 14, 1958 |
| 2,860,867 | Allen | Nov. 18, 1958 |
| 2,879,054 | Wohler | Mar. 24, 1959 |
| 2,882,035 | Lauler | Apr. 14, 1959 |
| 2,939,694 | Bradley | June 7, 1960 |

FOREIGN PATENTS

| | | |
|---|---|---|
| 725,926 | Great Britain | Mar. 9, 1955 |
| 779,259 | Great Britain | July 17, 1957 |

Notice of Adverse Decision in Interference

In Interference No. 93,465 involving Patent No. 3,042,128, R. E. Bell and R. B. Williams, Jr., Condition responsive device with motion detecting means, final judgment adverse to the patentees was rendered Aug. 14, 1964, as to claims 4, 5, 6 and 7.

[*Official Gazette December 22, 1964.*]

Notice

In an Interference No. 93,465 involving Patent No. 3,042,128, R. E. Bell and R. B. Williams, Jr., CONDITION RESPONSIVE DEVICE WITH MOTION DETECTING MEANS, final judgment adverse to the patentees was rendered Aug. 14, 1964, as to claim 7.

This notice supersedes the one previously issued in the Official Gazette of Dec. 22, 1964, vol. 809, p. 981.

[*Official Gazette March 30, 1965.*]